United States Patent [19]

Oligschlaeger

[11] 4,098,433

[45] Jul. 4, 1978

[54] HYDRAULIC SYSTEM FOR BROADCAST SPREADER

[75] Inventor: Frederick Frank Oligschlaeger, Springfield, Ill.

[73] Assignee: Dickey-john Corporation, Auburn, Ill.

[21] Appl. No.: 766,981

[22] Filed: Feb. 9, 1977

[51] Int. Cl.² .............................................. F04B 17/06
[52] U.S. Cl. ...................................... 222/63; 222/627; 239/677
[58] Field of Search ............... 222/178, 61, 57, 263, 222/626, 627, 63; 239/677; 214/83.36

[56] References Cited

U.S. PATENT DOCUMENTS 3,550,866  2/1969  Swenson .............................. 239/677
3,776,431  12/1973  Riley .................................... 239/677

*Primary Examiner*—Allen N. Knowles
*Assistant Examiner*—David A. Scherbel
*Attorney, Agent, or Firm*—Olson, Trexler, Wolters, Bushnell & Fosse, Ltd.

[57] ABSTRACT

A broadcast spreader having one or more spinners driven by hydraulic motors and a material delivery conveyor or auger driven by a hydraulic motor is provided with a hydraulic system including a flow and pressure-compensated variable displacement pump and pressure-compensated control valves respectively for the spinner and conveyor motors connected so that the volume of fluid delivered by the pump corresponds to the demands of the motors.

9 Claims, 2 Drawing Figures

HYDRAULIC SYSTEM FOR BROADCAST SPREADER

BACKGROUND OF THE INVENTION

The present invention relates to a novel hydraulic drive system for a broadcast spreader.

Spreaders of a type mounted on a truck or similar vehicle are well known for dispensing granular material such as salt or sand on highways and streets or other materials such as fertilizer and limestone on farms. Such spreaders usually include a dispensing mechanism such as one or more spinner discs for throwing the material outwardly and an auger or conveyor for delivering the material from a box or other similar source of supply to the spinner. It has been common practice to drive the spinner and the conveyor by separate hydraulic motors supplied by hydraulic fluid under pressure from a fixed displacement pump driven by the engine of the vehicle. Since the engine speed of the vehicle and therefore the pump speed will vary during operation and since it is frequently desirable to adjust the speeds of either the spinner motor or the conveyor motor, or both, the volume of hydraulic fluid under pressure actually required to operate the motors varies widely with respect to the fluid actually delivered by the pump. Thus, it has been common practice to utilize a pressure compensated bypass flow regulator valve so that excess fluid delivered by the pump is directed back to the pump reservoir.

With hydraulic systems of the type heretofore contemplated for such spreader apparatus, the fact is that there is practically always a significant surplus of fluid or oil being pumped and being dumped back to the reservoir and this results in undesirable oil heating. As a result, it has been necessary to utilize relatively large hydraulic reservoirs, radiators and the like in order to accommodate or eliminate oil overheating.

It is an important object of the present invention to provide a novel hydraulic drive system for a plurality of components such as spinners and conveyors in a spreader whereby heat problems are substantially reduced or eliminated and hydraulic system efficiency is greatly improved.

A further more specific object of the present invention is to provide a novel hydraulic system of the above described type wherein the volume of hydraulic fluid actually pumped is varied in accordance with the needs of the workload whereby pumping of excess fluid is substantially eliminated.

Other objects of the present invention are to provide a novel hydraulic system of the above described type which is of relatively simple and economical construction, is easy to install and has improved reliability.

Other objects and advantages of the present invention will become apparent from the following description and the accompanying drawings wherein like reference numerals are used throughout to indicate similar elements and components.

SHORT DESCRIPTION OF THE DRAWINGS

FIG. 1 comprises a simplified partial schematic view showing of a truck mounted broadcast spreader including a hydraulic system incorporating features of the present invention; and FIG. 2 comprises a simplified partial schematic view of a truck mounted broadcast spreader, similar to FIG. 1, including an alternate embodiment of a hydraulic system incorporating features of the present invention.

DETAILED DESCRIPTION

Figure 1:
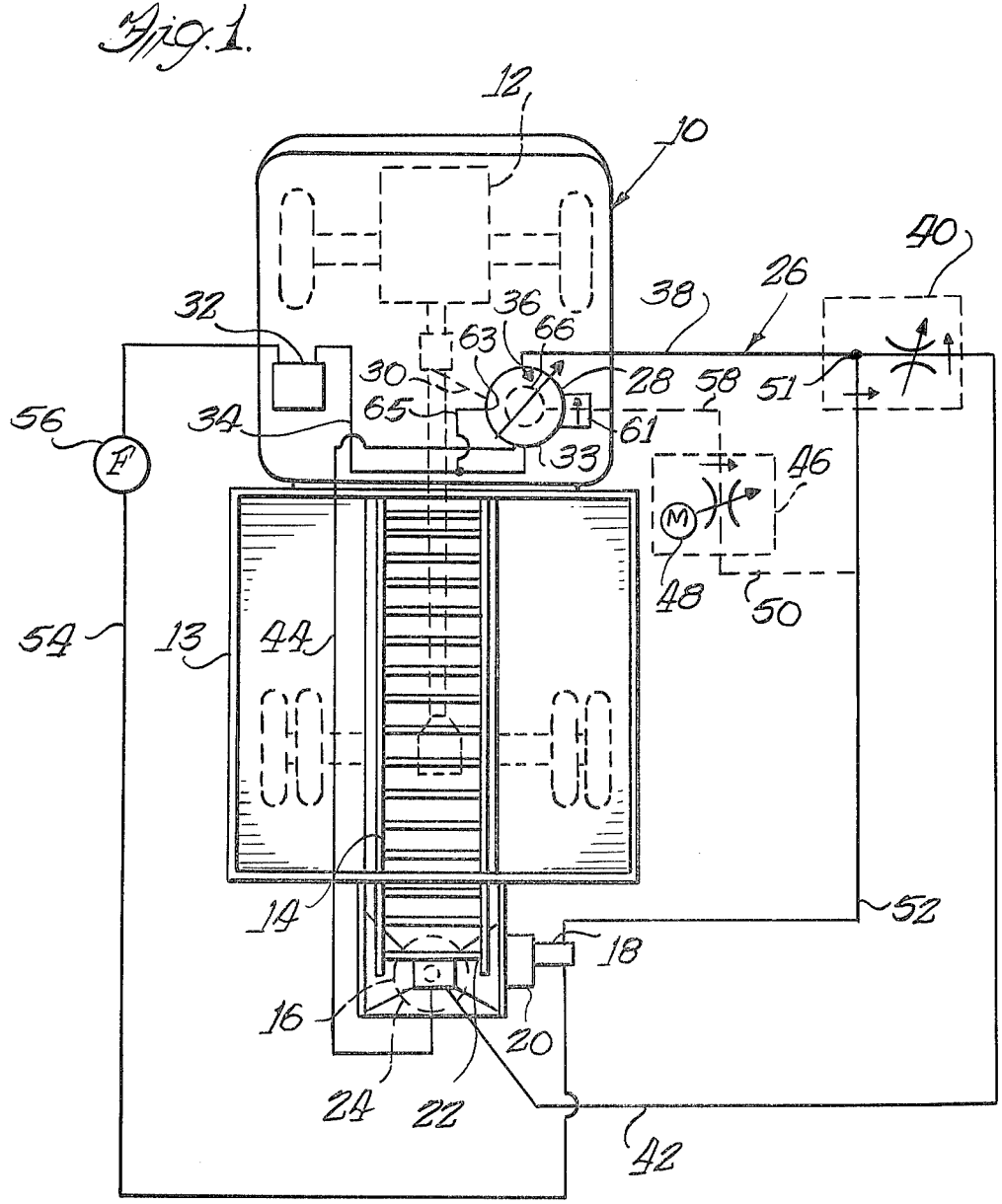
Figure 2:
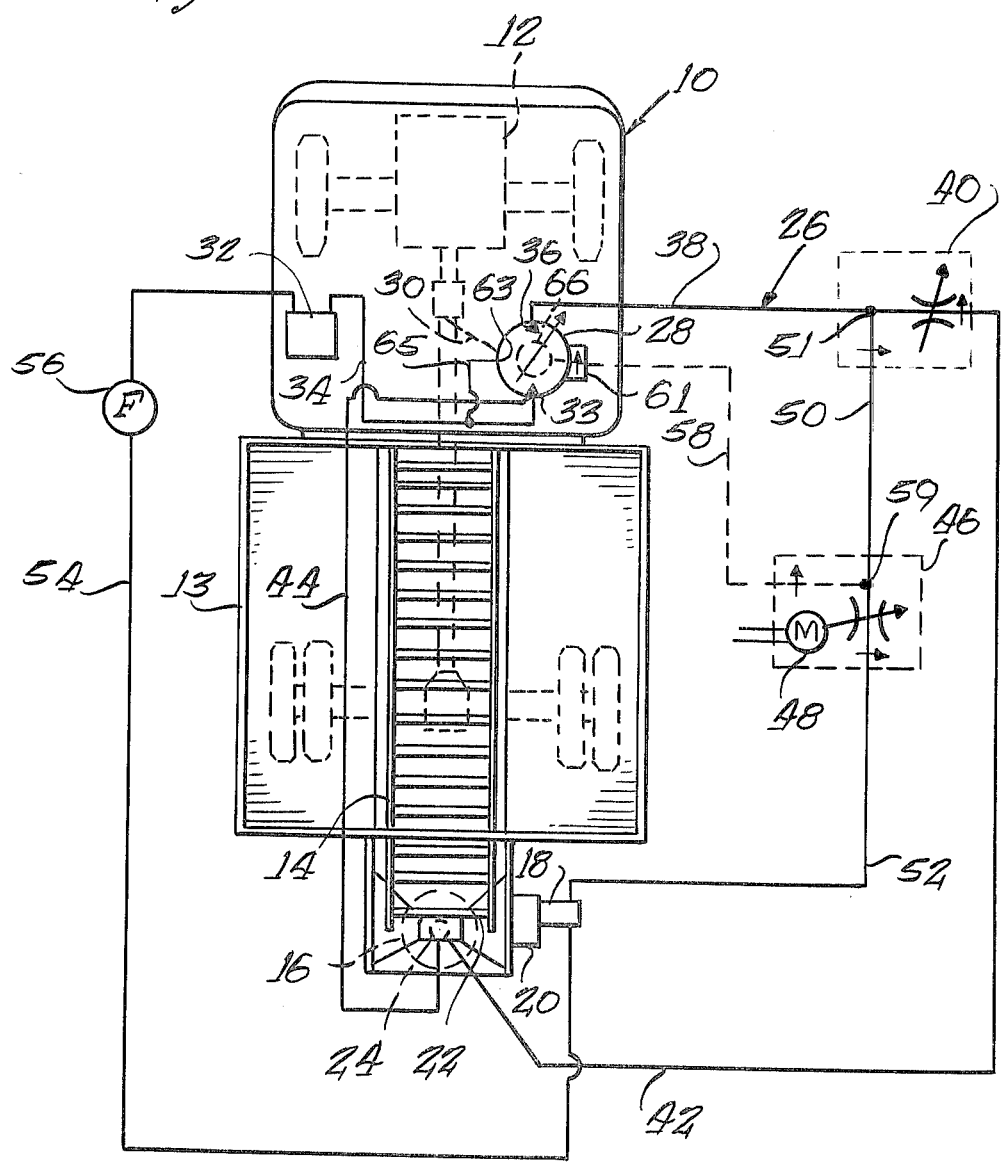

Referring now more specifically to FIGS. 1 and 2, a spreader apparatus of the type contemplated herein includes a vehicle or truck 10 having a conventional engine 12 and suitable transmission and drive means. A box 13 is mounted on the truck for containing a supply of material to be spread. As will be understood, the spreader may be used for dispensing materials such as salt, sand, cinders and the like on highways. It may also be used on farms for spreading fertilizer, limestone and the like.

In the embodiment shown for purposes of illustrating the present invention, an endless conveyor 14 is provided along the bottom of the box for delivering material to a broadcast spreader disc 16. A hydraulic motor 18 connected to a suitable transmission 20 is provided for driving a shaft 22 of the endless conveyor and another hydraulic motor 24 is connected for driving the spinner 16. These motors can be of the "2000 Series" type offered by Eaton Corporation, Fluid Power Division, Char-Lynn Plant, Eden Prairie, Minn., or the motors can be of the "25X" type offered by Commercial Shearing and Stamping Company, Youngstown, Ohio. As will be understood, the spreader may be provided with two or more spinners in a known manner or other types of dispensing mechanisms suitably driven by one or more hydraulic motors. Similarly, the spreader may include other types of conveyors such as helical screws or augers for delivering the material from the source of supply or box 13 to the dispensing mechanisms.

In accordance with the present invention, the spreader is provided with a novel hydraulic system 26 for controlling and driving the conveyor and spinner motors 18 and 24. The hydraulic system comprises a pressure and flow compensated variable displacement piston pump 28 driven by a suitable power take-off 30 from the vehicle engine 12. The variable displacement pump may be of various known constructions such as a John Deere "PR40" type variable displacement, pressure-compensated discharge pump, available from Deere & Company, Moline, Ill. The pump has an inlet port 33 connected with a tank or reservoir 32 of hydraulic fluid by conduit 34 and an outlet port 36 connected with the hydraulic pressure line 38. It will be appreciated that during the normal operation of the spreader vehicle over a road or field, the speed of engine 12 and the power take-off 30 will vary, and thus the speed at which the pump 28 is driven will vary. However, the variable displacement pump is adjustable as described below so that regardless of the speed at which it is driven, only the required volume of hydraulic fluid will be delivered at the outlet port 36.

Within the limits of the design capabilities of the particular pump, this volume is maintained regardless of the demand by the system. For example, with the engine running and the control valves described below in a closed or off position so that the hydraulic motors 18 and 24 are not driven, the variable displacement pump will be in an idling or standby condition delivering only enough oil to maintain a desired preset standby pressure at the outlet 36.

Incorporated into the hydraulic system 26 is a first bypass style pressure compensated adjustable flow control valve 40 of known construction having an inlet communicating with the hydraulic line 38 and having an outlet connected by line 42 with the spinner motor 24. This valve 40 can be a pressure compensated combination restrictive and by-pass three-port flow regulator, as offered by Fluid Controls, Inc., Mentor, Ohio. An outlet of the spinner motor 24 is connected back to the pump inlet 33 by hydraulic line 44 so as to assure priming of the pump 28. In the embodiment shown, it is contemplated that the valve 40 may be located remotely or in the cab of the spreader truck and may be of a type suitable for manual adjustment so as to enable an operator to control the speed at which the broadcast spinner 16 is driven. It is also contemplated that a remotely located and adjustable valve could be used in the system for the valve 40.

While the speed of the spinner 16 is usually maintained relatively constant regardless of the speed at which the vehicle is driven, it is desirable to modulate the speed of the conveyor 14 in accordance with the speed of the vehicle so as to spread the material evenly over the area covered regardless of changes in the vehicle speed. Thus, the hydraulic system is provided with a pressure compensated adjustable flow control valve 46 of known construction controlled by servo motor 48. This valve 46 can be an electrically operated, pressure compensated, normally open flow control valve, as offered by the Fluid Power Systems Division of Ambac Industries, Wheeling, Ill. The servo motor may in turn be controlled suitable circuitry, not shown, responsive to signals corresponding to ground speed of the vehicle and to the speed of the conveyor shaft 22. For a disclosure pertaining to a suitable control circuitry for the servo valve, attention is directed to U.S. Pat. No. 3,550,866, which is incorporated herein by reference.

In the embodiment of FIG. 1, the valve 46 comprises a restrictive style pressure compensated valve which has an inlet connected by hydraulic lines 50 and 52 with the conveyor motor 18 and a bypass port 51 of the valve 40. An outlet of the valve 46 is connected by line 58 with the stroke control crankcase inlet valve 61 built into the variable displacement pump 28. The pump also has a flow control crankcase outlet orifice 63 connected to the tank 32 or the inlet line 34 by line 65. This arrangement is such that the valve 40 and line 52 and thus the conveyor and spinner motors are connected in parallel.

In the embodiment of FIG. 2, the valve 46 comprises a bypass style pressure compensated valve which has an inlet connected by branch hydraulic line 50 with a bypass port 51 of the valve 40. An outlet of the valve 46 is connected by line 52 with the conveyor motor 18 which has its outlet connnected by hydraulic line 54 through a filter 56 with the reservoir or tank 32. Hydraulic fluid pressure and flow compensating line 58 connects a bypass port 59 of the valve 46 with stroke control valve 61 built into the variable displacement pump 28. The pump also has a flow control crankcase outlet orifice 63 connected to the tank or the inlet line 34 by line 65. This arrangement is such that the valves 40 and 46 and thus the conveyor and spinner motors are connected in parallel.

In both embodiments, the arrangement is such that a constant flow rate of hydraulic fluid is utilized through the valve 40 and the spinner motor 24 for driving the motor 24 at a substantially constant speed regardless of any adjustments in the servo actuated valve 46 which serves to vary the speed of the conveyor motor 18. Furthermore, the hydraulic fluid or oil used to drive the spinner motor only passes through the control valve 40 and does not pass through the conveyor control valve 46 and vice versa, so that heating of the oil is minimized.

As previously indicated, the pump may be of various known constructions and need not be described in detail. It suffices to state that one suitable unit includes a crankcase or housing in which spring returned piston means is actuated by a cam and the effective length and displacement of the piston means stroke is controlled and adjusted by internal crankcase pressure which serves to oppose and limit the spring biased return or suction stoke of the piston. The internal crankcase pressure is controlled by the regulated output flow valve 46 connected by hydraulic line 58 to the stroke control valve 61 and by the size of the crankcase flow control orifice 63. For example, the orifice 63 is of a size restricting flow out of the crankcase 66 so that, in the embodiment of FIG. 1, when the control valve 40 is closed and control valve 46 is open and fluid is directed from the outlet port 36 through the bypass port 51 and conduits 52 and 50 through valve 46 and conduit 58 to the pump crankcase inlet 61, the pressure builds up in the crankcase to shorten the piston stroke and thereby reduce the pump output.

Similarly, referring to FIG. 2, when the control valves 40 and 46 are closed and fluid is directed from the outlet port 36 through the bypass ports 51 and 59 and conduit 58 to the pump crankcase, the pressure builds up in the crankcase to shorten the piston stroke and thereby reduce the pump output. The arrangement is such to obtain a minimum flow of, say 0.7 gpm, through the crankcase for maintaining a predetermined standby minimum pump output and pressure at the port 36.

Upon opening of the valve 40, the pressure in the line 38, the bypass lines 50 and 58 and pump crankcase inlet 61 drops and the pump 28 automatically increases its displacement in a known manner so as to increase the output sufficiently to increase and maintain the flow rate and the pressure in the power line 38 and through valve 40 sufficiently to satisfy the requirements of the spinner motor 24. This increase in output can be varied by adjusting the valve 40 to supply a sufficient volume of fluid to drive the spinner motor 24 at the desired rate.

When the conveyor control valve 46 of FIG. 1 is closed, the pressure in the outlet line 58 and the pump crankcase inlet 61 again tends to drop. Similarly, when the conveyor control valve 46 of FIG. 2 is open, the pressure in the branch line 50, the bypass line 58 and the pump crankcase again tends to drop. Again the displacement of the pump 28 is increased so as to increase the output sufficiently to supply the desired flow to conveyor drive motor 18 while providing desired flow to spinner motor 24. Of course, as the servo valve 46 is adjusted in accordance with variations in vehicle speed as described in detail in the aforementioned U.S. Pat. No. 3,550,866, corresponding pressure variations in bypass line 58 will occur so as to automatically increase or decrease the displacement and output of the pump 28 for maintaining the desired pressure and flow at the output port 36.

In other words, the arrangement is such that the pump 28 will respond to any variation in the demand for fluid provided by any adjustment of the spinner motor control valve 40, and will also respond independently to any demand for fluid caused by variations in the adjustment of conveyor motor control valve 46 so that the pump delivers only the required amount of hydraulic oil at all times. Thus, there is no pumping and bypassing of any substantial volumes of hydraulic oil in excess of the amount of oil actually required to operate the conveyor and the spinner motors whereby heating of the oil and the problems associated therewith are minimized.

While a preferred embodiment of the present invention has been shown and described herein, it is obvious that many details may be changed without departing from the spirit and scope of the appended claims.

The invention is claimed as follows:

1. A hydraulic drive system for a spreader vehicle having an engine, a dispensing mechanism and conveyor means for delivering material to be spread to the dispensing mechanism; said system comprising first hydraulic motor means connected with said dispensing mechanism for driving said dispensing mechanism; second hydraulic motor means connected with said conveyor means for driving said conveyor means; a variable displacement pressure compensated pump for delivering hydraulic fluid at a variable rate substantially in accordance with demand by said motor means; hydraulic circuit means connecting said pump and said motor means and including a first hydraulic power line connected to the pump outlet, a first control valve connected to said power line for controlling fluid flow to said first motor means, a second power line in parallel with said first control valve for supplying fluid to said second motor means, and means connected to said second power line and to said pump including control valve means for providing a fluid pressure signal to said pump responsive to fluid flow through said valves for adjusting the pump displacement.

2. A system, as defined in claim 1, wherein said means for providing a fluid pressure signal to the pump comprises a second control valve connected between said second power line and said second motor means and a fluid pressure bypass line connected between said second power line and said pump.

3. A system, defined in claim 2, wherein said first valve comprises a manually adjustable pressure compensated bypass type flow control valve for maintaining a predetermined generally constant fluid flow to said first motor means for driving said dispensing mechanism at a substantially constant predetermined rate, and said second valve means comprises a servo adjustable pressure compensated by-pass type flow control valve responsive to signal means operable in accordance with the speed of the vehicle for varying the fluid flow to said second motor means for adjusting the speed of the conveyor means.

4. A system, as defined in claim 1, wherein said means for providing a fluid pressure signal to the pump comprises a second control valve connected between said second power line and said pump, said second power line being connected directly to said second motor means.

5. A system, defined in claim 4, wherein said first valve comprises a manually adjustable pressure compensated bypass type flow control valve for maintaining a predetermined generally constant fluid flow to said first motor means for driving said dispensing mechanism at a substantially constant predetermined rate, and said second valve means comprises a servo adjustable pressure compensated restrictive type flow control valve responsive to signal means operable in accordance with the speed of the vehicle for varying the fluid flow to said pump crankcase inlet which in turn controls flow to said second motor means for adjusting the speed of the conveyor means.

6. A system, as defined in claim 1, wherein said hydraulic circuit includes a hydraulic fluid reservoir, conduit means connecting an outlet of said first motor means back to said pump for recirculating fluid from said first motor means and additional conduit means connecting an outlet of said second motor means with said reservoir.

7. A system, as defined in claim 1, wherein said dispensing mechanism includes at least one broadcast spinner, and said first motor means includes at least one hydraulic motor.

8. A spreader for dispensing granular material on highways, farms and the like comprising a vehicle having an engine; a box on said vehicle for containing a supply of material to be dispensed; a dispensing mechanism mounted on said vehicle; a conveyor mounted on said vehicle for delivering materials to be spread from said box to said dispensing mechanism; a first hydraulic motor connected with said dispensing mechanism for driving said dispensing mechanism; a second hydraulic motor connected with said conveyor for driving said conveyor; a variable displacement pressure compensated pump mounted on said vehicle and drivingly connected with said engine for being driven at variable speeds in accordance with engine speed and for delivering hydraulic fluid at variable rates in accordance with demands by said motors; said pump including a pressurized crankcase having a fluid pressure signal inlet for controlling pump displacement; hydraulic circuit means connecting said pump and said motors and including a first valve connected with an outlet of said pump for controlling fluid flow to said first motor; said circuit means also including conduit means extending from a connection by passing said first valve to an inlet of said second motor; said first valve and said conduit means being in parallel; and said circuit means including a second valve connected between said conduit means and said crankcase inlet of said pump for controlling fluid flow to said second motor and for providing a fluid pressure signal to said inlet responsive to fluid flow through said valves for adjusting the pump displacement.

9. A spreader as defined in claim 8, wherein said first valve comprises a by-pass type pressure compensated valve having a bypass port connected with said conduit means, and said second valve comprises a restrictive type pressure compensated valve.

* * * * *